United States Patent Office 3,451,764
Patented June 24, 1969

---

3,451,764
PREPARATION OF NEW TUNGSTIC ACIDS
Dalton C. MacWilliams, Alamo, Calif., and Robert D. Hansen, Midland, Mich., assignors to The Dow Chemical Company, Midland, Mich., a corporation of Delaware
No Drawing. Filed Jan. 16, 1967, Ser. No. 609,302
Int. Cl. C01g 41/00
U.S. Cl. 23—51                                                     7 Claims

ABSTRACT OF THE DISCLOSURE

New fine-particle sized tungstic acids having the formula $H_{2-a}(NH_4)_aWO_4 \cdot xH_2O$ wherein $a$ has a value between 0.1 and 0.3 and $x$ has a value between 0 and 2 are claimed. Also methods of preparation of such tungstic acids by reaction between a tunstate salt dissolved or dispersed in water and a strongly acidic acid-form cation exchange resin or ammonium salt thereof under conditions to give the new tungstic acids are claimed.

---

This invention concerns a method for making a tungstic acid having a uniform, fine particle size ranging between 0.1–2 microns. Upon reduction, such tungstic acid gives a metal powder having substantially the same particle size range and stability to growth. It also concerns as a new product a tungstic acid which contains a minor proportion of combined ammonium ion.

It is well recognized in the art that fine-grained tungstic oxide is a prerequisite to a fine-grained structure in the reduced and sintered tungsten metal prepared therefrom. (Smithells, Tungsten, Chemical Publishing Company, New York, 1953, p. 57.) The ability to prepare a tungstic oxide of controlled particle size with little tendency to grow is, therefore, desirable. Until this invention, it was not known how to prepare a tungstic acid having stability to growth and from which can be prepared tungstic oxide and tungsten metal powder also having stability to growth. Prior commercial tungstic oxides had no uniformity of particle size, nor shape, unlike the tungstic oxides which can be prepared from the tungstic acids of this invention.

The products of this invention are stable to growth for many weeks when in contact with mother liquor, in sharp distinction to the usual behavior of submicron-sized tungsten oxides. The studies of Heller et al. [J. Chem. Phys., 10, 997–999 (1948)] and of Feitknecht [Chem. Abstr., 40, 3324 (1946)] describe tungsten oxides which start out as colloidal, submicron-sized particles but which grow into larger particles on standing. These particles are, in their final form, rod-shaped, and 2-micron or even larger in their long dimension, according to Heller et al.

It has now been discovered that a new desirable tungstic acid can be prepared which gives rise to the desirable products mentioned above by precipitating a tungstic acid under conditions to give a minor amount of ammonium substitution. The tungstic acids of this invention have the formula $H_{2-a}(NH_4)_aWO_4 \cdot xH_2O$, wherein $a$ has a value between 0.1 and 0.3 and $x$ has a value between 0 and 2. Such tungstic acids are prepared in several ways. An aqueous solution of an alkali metal tungstate, e.g., $Na_2WO_4 \cdot 2H_2O$ advantageously containing from about 2 to 12 weight percent sodium tungstate, can be passed at ca. 0°–150° C. and advantageously at room temperature through a bed of a conventional acid-form phosphonic acid or sulfonic acid cation exchange resin, e.g., Dowex 50W X–4 H+ resin, a polymeric styrene sulfonic acid crosslinked with 4% divinylbenzene, in an amount at least sufficient to exchange sodium ions for protons. The effluent tungstic acid solution thereby resulting is reacted with sufficient aqueous ammonium hydroxide as such or added as equivalent ammonia gas to give a solution which, when heated at ca. 50°–150° C., precipitates a sol the particles of which are dendritic clusters having needle-like projections from the core. The sol particles have the formula $H_{2-a}(NH_4)_aWO_4 \cdot xH_2O$. A precipitation time of ½ hour to about 3 hours is required.

In a variation of the preceding method, an aqueous solution of sodium or other alkali metal tungstate is passed through a bed of a strong acid cation exchange resin in the ammonium salt form in amount at least sufficient to exchange the sodium or other alkali metal cations for $NH_4^+$ ions. Additional $NH_4^+$ salt, e.g., $NH_4Cl$ or $NH_4NO_3$, may be added to reduce particle size of the resulting dendritic clusters. The operable range of $NH_4^+$ salt useful in reducing particle size is from 0 to $10^{-1}$ molar. The resulting solution is treated batchwise with strong acid cation exchange resin in amount sufficient to give a solution which on heating to 50°–150° C. precipitates a sol of dendritic clusters of the formula

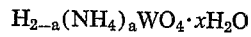

A proportion of 1.9 equivalents of resin and advantageously up to ca. 2.5 equivalents of acid-form resin as H+ per mole of $WO_3$ is used. There is no advantage in using higher proportions of acid-form resin.

Alternately, ammonium paratungstate,

is slurried in water at 0°–150° C. with acid-form phosphonic or sulfonic acid cation exchange resin in amount at least sufficient to give one equivalent of resin and advantageously up to 1.7 equivalents of resin as H+ per mole of $WO_3$. The resin is filtered off and the resulting tungstic acid solution is heated to about 50°–150° C. to give a sol of dendritic clusters of composition

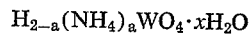

Any water-soluble or insoluble tungstate salt which can be converted into tungstic acid is operable in at least one of the alternative processes of this invention, e.g., alkali metal and ammonium, alkaline earth and heavy metal tungstates and ores such as scheelite, wolframite, ferberite and hubnerite.

After heating the tungstic acids of this invention to precipitate a sol having colloidal, dendritic clusters of $H_{2-a}(NH_4)_aWO_4 \cdot xH_2O$, a procedure which requires ½ to 3 hours at 50°–150° C., the sol is heated to dehydrate the tungstic acid, advantageously by heating at 110° C. The tungstic acid is further dehydrated by heating to 300°–600° C. for a period of time to give $WO_3$, and the $WO_3$ is reduced with hydrogen in usual ways, advantageously by heating in a hydrogen atmosphere at ca. 600°–800° C.

The $WO_3$ particles obtained via the $$H_{2-a}(NH_4)_aWO_4 \cdot xH_2O$$

route are predominantly uniform and range between 0.1 and 2 microns in particle diameter. The desired particle diameter can be controlled largely by maintaining the concentration of the starting tungstic acid solution within the range of 2 weight percent as $Na_2WO_4 \cdot 2H_2O$ up to saturation with respect to the same salt, and to a lesser degree on the ammonium ion concentration in the system. The tungstic acid sol particles do not "grow" on standing in mother liquor as do prior art tungstic acids, and the $WO_3$ and W metal powder particles obtainable therefrom have a reduced tendency to grow on heating or working.

The only description of a tungsten oxide material with a physical conformation similar to the material of the present invention is given by Duclaux and Cohn [Bull. Soc. Chem., France (1956), 1289–93]. They describe needles radiating from a center. However, these particles are much larger than those described presently because the fine structure was visible under an optical microscope. The particles of the present invention cannot be resolved under an optical microscope, but appear as small spheres, due to the limited resolving power of an optical microscope. In order to view the fine structure of these particles, it is necessary to use an electron microscope. Thus, it may be concluded that the material of the present invention represents a unique physical form in that the particle size is smaller than any material of similar physical configuration previously described. The resistance of the configuration to growth in particle size upon reduction with hydrogen has been established. The failure of smaller-sized products of different habit but similar crystallographic configuration to maintain uniform size upon reduction illustrates a unique property of the dendritic cluster type habit.

While it is not desired to be bound by any theory, it is believed that the ammonium ions control the rate of nucleation probably by decreasing the relative super-saturation of the tungstic acid solution.

The following examples describe completely representative specific embodiments and the best modes contemplated by the inventors for carrying out the invention. They are not intended to be limitative of the invention other than as defined in the claims.

EXAMPLE 1

Place 0.789 equivalents of Dowex 50 X–4, 50–100 mesh $NH_4^+$-form sulfonic acid ion exchange resin in a one-inch diameter column. Pass a 6 weight percent aqueous solution of $Na_2WO_4 \cdot 2H_2O$ into the column at 2.5 ml./cm.²/min. until $Na^+$ breaks through. Treat the effluent with a stoichiometric amount of Dowex 50 X–4, 50–100 mesh $H^+$-form resin by slurrying the resin therewith for 10 minutes. Remove the resin with a coarse-porosity frit filter and put the resulting tungstic acid filtrate in a glass or a polyethylene pot. Heat to incipient boiling for 3 hours. Separate the product by spray drying or flocculating and filtering or centrifuging. The product particles have a particle diameter ranging between 0.1 and 0.4 microns and look like dendritic clusters. They have a statistical average formula of $$H_{1.8}(NH_4)_{0.2}WO_4 \cdot xH_2O$$

EXAMPLE 2

Place 25 g. of water-insoluble ammonium paratungstate in 500 ml. of water and slurry in 250 g. wet Dowex 50 X–4, $H^+$-form resin. Filter immediately after solution of the tungstate is complete and heat the resulting filtrate 3 hours at 90°–100° C. as above. Similar dendritic clusters are obtained. They have a statistical average formula of $H_{1.8}(NH_4)_{0.2}WO_4 \cdot xH_2O$.

EXAMPLE 3

Pass a solution of $Na_2WO_4 \cdot 2H_2O$ (43.2 g./l.) through a column of Dowex 50W X–4, $H^+$ sulfonic acid cation exchange resin. The solution from the center of the elution band is collected and divided into equal portions. Varying amounts of $NH_3$ are added to these portions, then the solutions are placed in a 95° C. bath for precipitation. The results of these preparations are shown in the following table.

| Sample No. | Meq. $H_2WO_4$ | Meq. $NH_3$ | Percent N in solution species | Percent N in precipitate [1] | a [2] |
|---|---|---|---|---|---|
| A | 13.1 | 0.75 | 0.657 | 0.706 | 0.1 |
| B | 13.1 | 1.00 | 0.845 | | |
| C | 13.1 | 1.30 | 1.10 | 1.12 | 0.20 |
| D | 13.1 | 1.60 | 1.34 | 1.26 | 0.23 |
| E | 13.1 | 1.90 | 1.53 | | |
| F | 13.1 | 2.20 | 1.83 | 1.53 | 0.28 |

[1] Kjeldahl method.
[2] Amount of $NH_4$ in precipitate, $(H)_{2-a}(NH_4)_aWO_4 \cdot \frac{1}{2}H_2O$.

The column "percent N in solution species" is calculated from the previous two columns on the basis of substitution of $NH_4^+$ for $H^+$ in $H_2WO_4$. The last column is the amount of $NH_4^+$ in the precipitate calculated from the analytical results.

Electron microscopy shows that the particles of the products obtained have a dendritic cluster structure and a particle diameter ranging between 0.1 and 2 microns.

EXAMPLE 4

Place 26 equivalents of Dowex 50W X–4, 50–100 mesh, $NH_4^+$-form sulfonic acid cation exchange resin in a 6-inch diameter plastic column. Pass 4.0 lbs. of $Na_2WO_4 \cdot 2H_2O$ as a 6% aqueous solution through the column. After the water in the column has been displaced, collect the effluent solution. Rinse with deionized water, continuing to collect effluent solution until a total of 42 liters of effluent is collected. Contact this solution with 19.1 equivalents of Dowex 50W X–4, 50–100, $H^+$ form resin by stirring therewith for 15 minutes. Separate the solution from the resin and place the solution in a glass flask. Heat the solution to ca. 95°–99° C. for 3 hours. After allowing to cool, add sufficient $NH_4Cl$ to make sol .05 molar in $NH_4Cl$ to floc sol, filter the resultant precipitate and dry the precipitate at 110° C. Then heat the resulting tungstic acid (containing combined $NH_4^+$) to 400° C. to convert it to $WO_3$. A quantity of 966 grams of $WO_3$ is recovered. Examination of the tungstic acid by electron microscopy shows the particulate dendritic clusters to be in the 0.1–0.3 micron size range.

The $WO_3$ is loaded into a 4-inch diameter nickel tube and placed in a horizontal tube furnace in which the nickel tube can be rotated on its axis. Purified $H_2$ gas at 36 liters per minute is passed through the tube with the following progressive schedule: 3 hrs. at 500° C.; 3 hrs. at 600° C.; 3 hrs. at 700° C., and 3 hrs. at 800° C. The temperature is then allowed to return to room temperature with a slow flow of hydrogen. The tube is then flushed out with argon gas and the reduced tungsten powder unloaded in an inert gas glove box. Electron micrographs of the tungsten powder show particles in the 0.1–0.6 micron range. The oxygen content of the powder is 0.089±0.010%.

EXAMPLE 5

The control of particle size by addition of ammonium chloride is illustrated by the following. A solution of $Na_2WO_4 \cdot 2H_2O$, 43.2 g./l., is passed through Dowex 50W X–4, $NH_4^+$-form sulfonic acid resin and the center of the elution band is collected. To 100 ml. portions are added $NH_4Cl$ sufficient to give the below-indicated final molarities. Each such solution is batch treated with 17.12 g. Dowex 50 X–4, $H^+$-form resin for 10 minutes. The resin is removed by decanting the supernatant liquid which is then heated 3 hrs. at incipient boiling. Electronmicrographs of the products are made. The diameters of the resulting dendritic clusters are estimated as follows.

| $NH_4Cl$ (M): | Particle size, micron |
|---|---|
| 0 | 0.7 |
| $10^{-2}$ | 0.6 |
| $2 \times 10^{-2}$ | 0.4 |
| $3 \times 10^{-2}$ | 0.3 |
| $6 \times 10^{-2}$ | 0.2 |
| $10^{-1}$ | 0.1 |
| $3 \times 10^{-1}$ | 0.1 |

EXAMPLE 6

Pass 720 g. of a solution of $Na_2WO_4 \cdot 2H_2O$ (43.2 g./l.) through a column of Dowex 50W X-4, 50-100 mesh, $NH_4^+$-form sulfonic acid cation exchange resin. Discard the first 50 ml. of effluent. Collect the remainder of the effluent. Rinse with water and collect effluent until a total of 1000 ml. is collected. Contact the effluent solution with 192.5 g. of Dowex 50W X-4, 50-100 mesh, H+-form sulfonic acid cation exchange resin for 15 minutes. Filter off the resin from the solution. Place a portion of the resultant solution in a glass vessel, seal off the vessel and place in an oil bath at 150° C. for 3 hours. After cooling and removing the resulting sol, examination with the electron microscope shows the usual dendritic clusters of particle diameter about 0.2 to 0.4 micron.

What is claimed is:
1. A tungstic acid having the formula

$$H_{2-a}(NH_4)_aWO_4 \cdot xH_2O$$

wherein $a$ ranges between 0.1 and 0.3 and $x$ ranges between 0 and 2, the particles of which are dendritic clusters and range between 0.1 and 2 microns in particle diameter.

2. Process for making a tungstic acid having the formula $H_{2-a}(NH_4)_aWO_4 \cdot xH_2O$, which comprises reacting a solution or dispersion of a tungstate salt in water with a strongly acidic acid-form cation exchange resin in amount at least sufficient to replace tungstate salt cations with protons, separating the resulting tungstic acid solution from the resin, adding ammonium hydroxide to the tungstic acid solution in amount sufficient to form $H_{2-a}(NH_4)_aWO_4 \cdot xH_2O$ and heating the resulting tungstic acid solution at 50° C.–150° C. for a time sufficient to precipitate a sol, the particles of which are dendritic clusters, having a particle diameter ranging between 0.1 and 2 microns, and having the formula $$H_{2-a}(NH_4)_aWO_4 \cdot xH_2O$$

wherein $a$ ranges between 0.1 and 0.3 and $x$ ranges between 0 and 2.

3. The process of claim 2 wherein aqueous sodium tungstate solution is reacted in a column of acid-form sulfonic acid cation exchange resin in excess of the amount required to form tungstic acid, and ammonium hydroxide is added to the resulting tungstic acid solution in amount sufficient to give $H_{2-a}(NH_4)_aWO_4 \cdot xH_2O$ wherein $a$ ranges between 0.1 and 0.3 and $x$ ranges between 0 and 2.

4. Process for making a tungstic acid having the formula $H_{2-a}(NH_4)_aWO_4 \cdot xH_2O$, which comprises reacting a dispersion in water of ammonium paratungstate batchwise with a sulfonic acid cation exchange resin using between 1 and 1.7 equivalents of H+ resin per mole of $WO_3$ as ammonium paratungstate, separating the resulting tungstic acid solution containing ammonium ions from the cation exchange resin and heating said tungstic acid solution to 50°–150° C. for a time sufficient to precipitate a tungstic acid sol having the formula $$H_{2-a}(NH_4)_aWO_4 \cdot xH_2O$$

wherein $a$ ranges between 0.1 and 0.3 and $x$ ranges between 0 and 2, the particles of which are dendritic clusters having a particle diameter ranging between 0.1 and 2 microns.

5. Process for making tungstic acid having the formula $H_{2-a}(NH_4)_aWO_4 \cdot xH_2O$, which comprises passing aqueous alkali metal tungstate through a bed of a strong acid cation exchange resin in the ammonium salt form in amount at least sufficient to exchange alkali metal cations for ammonium ions and reacting the resulting effluent batchwise with strong acid cation exchange resin in the acid form in amount sufficient to give a solution which on heating to 50°–150° C. precipitates a tungstic acid sol having the formula $H_{2-a}(NH_4)_aWO_4 \cdot xH_2O$, and heating said solution to 50°–150° C. to precipitate a tungstic acid sol having the formula $H_{2-a}(NH_4)_aWO_4 \cdot xH_2O$, wherein $a$ ranges between 0.1 and 0.3 and $x$ ranges between 0 and 2, the particles of which are dendritic clusters having a particle diameter ranging between 0.1 and 2 microns.

6. The process of claim 5 wherein the alkali metal tungstate is sodium tungstate.

7. The process of claim 5 wherein ammonium chloride or ammonium nitrate in amount up to $10^{-1}$ molar is added to the effluent from the $NH_4^+$-form resin prior to treatment with acid-form resin.

References Cited

UNITED STATES PATENTS

| 2,244,325 | 6/1941 | Bird. | |
| 2,942,940 | 6/1960 | Osthoff. | |
| 3,231,329 | 1/1966 | Weiss et al. | 23—140 |
| 3,288,562 | 11/1966 | Laferty | 23—140 |

OTHER REFERENCES

Liberti: "Annalidi Chimica (Rome)," vol. 43, No. 7, November 1953, pp. 443–447.

Watson et al.: "Journal of Chemical Physics," vol. 10, 1948, pp. 997–999.

HERBERT T. CARTER, *Primary Examiner.*

U.S. Cl. X.R.

23—22, 24, 140; 75—121